United States Patent Office 2,787,022
Patented Apr. 2, 1957

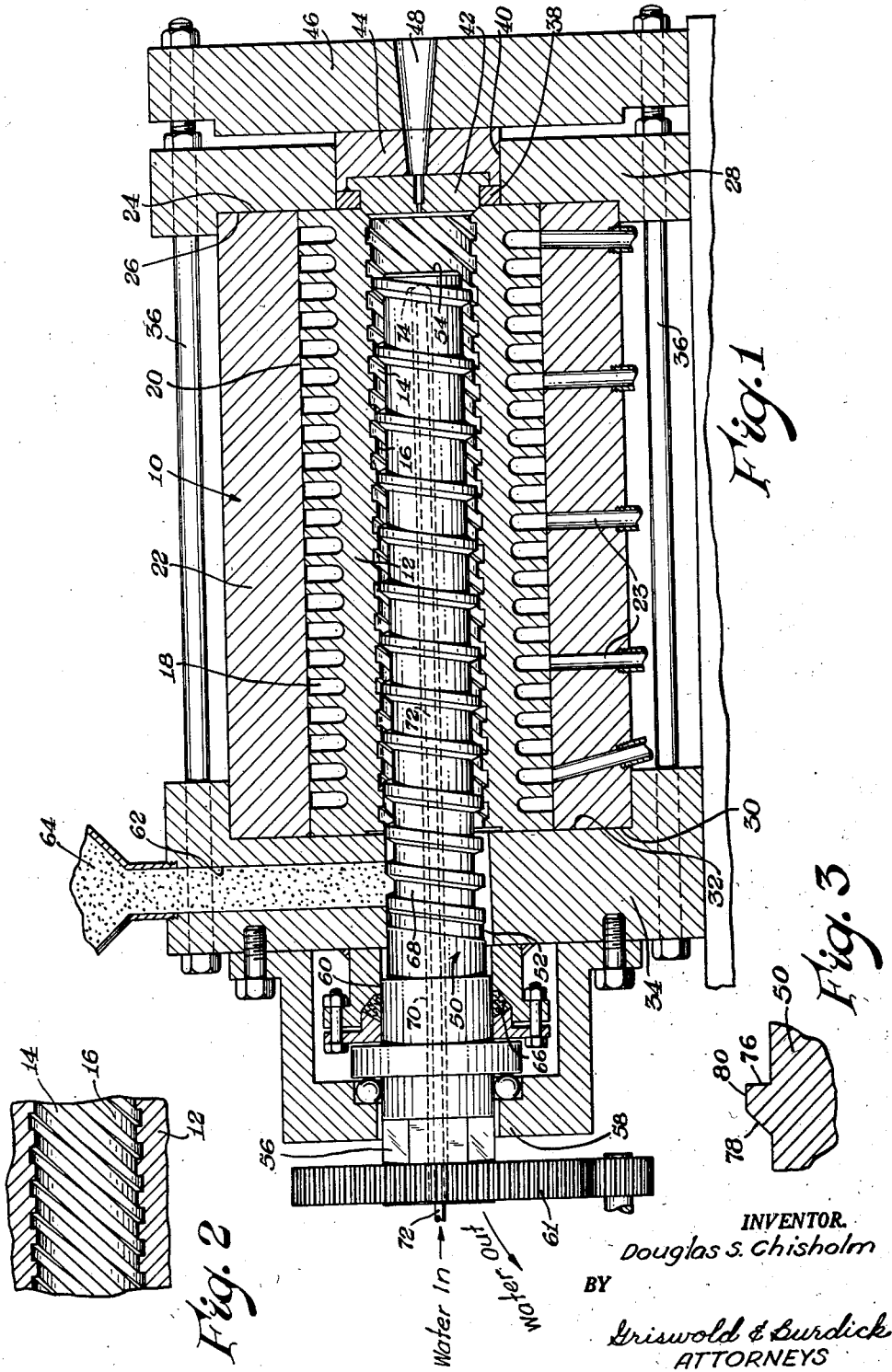

2,787,022

EXTRUSION APPARATUS

Douglas S. Chisholm, Midland, Mich., assignor to The Dow Chemical Company, Midland, Mich., a corporation of Delaware Application April 5, 1955, Serial No. 499,276

9 Claims. (Cl. 18—12)

This invention relates to extrusion apparatus adapted for use in the manufacture of metal articles or alloys of light metals wherein the pressure necessary for extruding the article or alloy is obtained by means of a screw revolving in a cylindrical screw casing or container.

The alloying of light metals containing magnesium as a base metal and the extruding of articles by ram extrusion of powdered metal has been done previously. However, when continuous lengths of metal are extruded by ram extrusion objectional die marks sometimes appear on the extruded article. Occasionally, during ram extrusion operations, bubbles of gas are entrapped in the extruded metal and weaken or disfigure the extruded article. Also, due to the presence of stringers in the extruded article, the transverse strength and longitudinal strength of the extruded materials often are quite different.

Accordingly, a principal object of this invention is to provide improved continuous extrusion apparatus for making continuous lengths of extruded light metal which contain no die marks, and are substantially free from entrapped gases.

Another object of this invention is to provide improved extrusion apparatus for making from powdered metal base material continuous lengths of light metal sections having more nearly balanced transverse and longitudinal strength than has been heretofore obtainable when such apparatus is used.

A further object of this invention is to provide improved extrusion apparatus for making alloys of light metals.

An additional object of this invention is to provide an improved screw for use in extrusion apparatus adapted to be fed with powdered light metal.

In accordance with this invention there is provided extrusion apparatus including a hollow cylindrical container, a die disposed at or near the output end of the container, and a screw disposed axially within said container. The pitch of the screw varies from a lead/diameter ratio of .35 to .75 at the feed end to a lead/diameter ratio of .60 to 1.0 at the die or output end of the screw. The variation in pitch must provide at least a 25 percent increase in the working volume of the screw at the die end as compared with the working volume at the feed end thereof.

The invention, as well as additional objects and advantages thereof, will best be understood when the following detailed description is read in connection with the accompanying drawings, in which:

Fig. 1 is a side elevational view, in section, of screw extrusion apparatus made in accordance with this invention;

Fig. 2 is a fragmentary view, in section, showing the rifling of the inner wall of the container, and Fig. 3 is a fragmentary view, in section and on an enlarged scale, showing a thread of the extrusion screw used in the apparatus.

Referring to Figs. 1 and 2, there is shown screw extrusion apparatus comprising a container 10 having a hollow cylindrically shaped liner 12 which has riflings 14 in the inner wall 16 thereof and spiral grooves 18 in the outer wall 20 thereof. The liner 12 fits within a massive sleeve 22 which has bores 23 connecting with the grooves 18. Cooling fluid, such as an air-water mixture, may be circulated around the grooves 18 in the liner 12 with the amount of coolant applied or withdrawn through the bores 23 controlling the temperature gradient along the liner 12. The container 10 is supported at its output end 24 within a counter-bored recess 26 in a massive head plate 28 and at the input end 30 within a counter-bored recess 32 in a massive back plate 34. The head plate 28 and back plate 34 are joined by heavy bolts 36 which are tightened to keep the container 10 under compression. A die ring 38 fits within a bore 40 in the head plate 28 and holds a die 42 centered with respect to and abutting against the container liner 12. A die backer 44 fits within the bore 40 in the head plate 28 and bears against the die 42. The backer 44 extends beyond the headplate 28 and is held in place by a massive bolster 46 which is bolted to the head plate by means of the heavy bolts 36 which are disposed around the large central bore 48 in the bolster 46.

A massive screw 50 extends through a bore 52 in the back plate 34 and fits closely but slideably within the container liner 12. The forward end 54 of the screw lies about 2 inches from the die. The rear end part 56 of the screw 50 is supported or retained by a thrust bearing 58 which is secured to the backer plate 34 and by a journal bearing 60. The screw is driven by a gear drive arrangement 61 secured to the rear part 56 of the screw 50. The rear end part is often hexagonal, as shown, to permit more even distribution of load from the gear to screw shaft than if a key and keyway were used to couple the gear to the screw shaft. The journal bearing 60 supports the rear end part of the screw and keeps it concentric with the container liner, as the bore 52 in the back plate 34 through which the screw 50 extends is of somewhat greater diameter than the diameter of the screw. The thrust bearing is illustrated as a ball bearing, but in practice other bearings, the Kingsbury type, for example, often are preferable.

The back plate 34 contains an elongated feed bore 62 which is transverse to and connects with the bore 52 through which the screw 50 extends. The elongated feed bore 62 is the means through which powdered metal or metal chips may be supplied to the feed end of the screw 50. The bore 52 in the back plate 34 is of larger diameter than the diameter of the screw 50 at the journal bearing side of the back plate 34 than at the container side of the back plate 34. The increase in diameter of the bore 52 facilitates the settling of the feed material 64 around the screw 50 and assures more uniform loading of the screw.

A packing gland 66 at the end of the journal bearing 60 prevents feed material from leaking around the bearing 60.

The screw 50 is of the left hand single thread type whereas the riflings 14 in the bore liner 12 have a right hand lead. The riflings 14 are useful and helpful in advancing the feed material along the container liner 12 in that the material being extruded "bites into" the rifling grooves 14 as it advances and provides something for the screw 50 to work against to prevent slippage of the feed material around the liner wall. However, the riflings may be disposed of with some loss in efficiency of operation.

The working volume of the screw increases along the length thereof from the threaded rear or feed end 68 towards the forward or die end 54.

The pitch of the thread of the screw 50 varies from a lead/diameter ratio of .35 to .75 at the feed end to a lead diameter of .60 to 1.0 at the die or output end of the screw. A screw having a lead/diameter ratio of .5 at the input end and a lead/diameter ratio of .75 at the output end has given good results with a wide variety of feed material compositions. Whatever lead/diameter ratios are chosen within the above limits, the variation in the pitch of the screw must provide at least a 25% increase in the working volume of the screw 50 at the forward or die end 54 as compared with the working volume at the feed end 68 thereof. This increase in working volume is best achieved by varying the pitch of the screw thread although changing the root diameter or land width may accomplish the same result. However, reducing the root diameter tends to weaken the screw and changing the land width may weaken the thread. Further, experience has shown that the ratio of screw diameter/container liner length should not be greater than ¼ in order to prevent excessive thermal stresses along the container liner 12 and screw 50 which cannot be removed by air and water cooling of the container liner 12 and screw 50. However, if the container line 12 and screw 50 were refrigerated, an increase in the above ratio could be tolerated.

The screw 50 is water cooled through an axially extending bore 70 which runs from the rear or drive end 56 of the screw 50 to near the forward or output end 54 thereof. The diameter of the cooling bore 70 is usually less than 25% of the root diameter of the screw in order not to unduly weaken the torque handling capabilities of the screw shaft. Water is introduced into the cooling bore 70 through a tube 72 which extends almost to the inner end 74 of the cooling bore 70. The distance the coolant tube 72 extends into the cooling bore 70 and the flow rate and initial temperature of the coolant may be adjusted to provide a desired temperature gradient along the cooling bore 70. As shown, the water or other coolant which has been circulated through the screw 50 spills out the rear or drive end 56 of the screw and is not cooled and recirculated. However, a closed circuit heating and cooling system could be used if desired.

The individual threads of the screw, as best shown in Fig. 3, have perpendicular forward facing walls 76, tapered trailing walls 78, and have flat-tops 80.

The threaded part of the screw 50 begins slightly to the rear of the feed bore 62 in order to facilitate loading of the screw 50.

In the operation of the extrusion apparatus shown in Fig. 1, feed material 64 in the form of powder or chips of light metals such as aluminum or magnesium, or alloys thereof, are fed into the screw through the feed bore. The feed materials settle around the enlarged bore 52 or section loading chamber in the back plate 34, and are moved forward as the screw 50 rotates. The container 10 is preheated before the extrusion apparatus is operated by circulating hot air through the inlet and outlet bores 23 which communicate with the spiral grooves 18 in the outer wall 20 of the container liner 12. However, while the apparatus is in operation considerable heat is generated in the container liner 12 by the action of the screw 50 on the feed material 64 and a coolant such as air or air plus water vapor, for example, must be applied through the spiral grooves 18 of the container liner 12 through the inlet and outlet bores 23 in order to maintain a suitable temperature gradient along the liner 12.

It has been found that screw rotation speeds of from 20 to 24 revolutions per minute provide relatively trouble-free operation. Operation of the screw 50 at slower speeds calls for closer control of the temperatures along the screw and container liner due to the feed material tending to build up closer to the feed end of the screw because the heat generated by the process affects the powder or chips for a longer period of time.

For general use with magnesium alloys, a screw having a lead/diameter ratio at the feed end of 0.5 and a lead/diameter ratio of 0.75 at the output end (with a uniform increase in pitch along the screw) has proven very satisfactory.

I claim:

1. Apparatus for extruding light metal sections comprising an elongated cylindrical container including a hollow cylindrical liner, a head plate including a die receiving bore therein, a back plate having a bore extending transversely therethrough, said container being disposed between said head plate and back plate with said die receiving bore and said bore in said back plate communicating with said hollow liner, a die, said die being secured within said die receiving bore, a rotatable screw, said screw extending through said bore in the back plate and into the container liner, the outer diameter of said screw being dimensioned to fit closely but slidably within said liner, said screw having a continuously threaded section including an input end and an output end and extending towards said die, meas for feeding particulated metal to the input end of said screw, the working volume of said screw continuously increasing from the input end to the output end thereof.

2. Apparatus in accordance with claim 1, wherein said working volume is increased by at least 25 percent at the output end of the screw by means of a change in pitch of the screw thread.

3. Apparatus in accordance with claim 1, wherein the output end of said screw is spaced from said die, the spacing distance being at least equal to two thirds of the diameter of the hollow liner.

4. Apparatus in accordance with claim 1, wherein said screw contains an axially extending water cooling bore whose diameter is not greater than one fourth the root diameter of the screw.

5. Apparatus in accordance with claim 1, wherein the ratio of screw diameter to liner length is not greater than ¼.

6. Apparatus in accordance with claim 2, wherein the pitch of the screw varies from a lead/diameter ratio of .35 to .75 at the input end to a lead/diameter ratio of .60 to 1.0 at the output end thereof.

7. Apparatus in accordance with claim 2, wherein the lead/diameter ratio of the screw thread is .5 at the input end and the lead/diameter ratio at the output end is .75.

8. Apparatus in accordance with claim 1, wherein the inner surface of said hollow cylindrical liner is grooved.

9. Apparatus in accordance with claim 1, wherein externally controllable means are provided for varying the temperature of said hollow cylindrical liner.

References Cited in the file of this patent

UNITED STATES PATENTS

| | | |
|---|---|---|
| 1,902,295 | Shook | Mar. 21, 1933 |
| 2,242,364 | Montanari | May 20, 1941 |
| 2,547,151 | Braeseke | Apr. 3, 1951 |
| 2,722,716 | Henning | Nov. 8, 1955 |

FOREIGN PATENTS

| | | |
|---|---|---|
| 326,112 | Germany | Sept. 13, 1920 |